United States Patent
Hayden et al.

(10) Patent No.: US 10,125,741 B2
(45) Date of Patent: Nov. 13, 2018

(54) WIND TURBINE ROTOR

(71) Applicant: Blade Dynamics Limited, Cowes, Isle of Wight (GB)

(72) Inventors: Paul Trevor Hayden, Cowes (GB); David Anthony Whiley, Shrewsbury (GB)

(73) Assignee: Blade Dynamics Limited, Cowes, Isle of Wight (GB)

( * ) Notice: Subject to any disclaimer, the term of this patent is extended or adjusted under 35 U.S.C. 154(b) by 884 days.

(21) Appl. No.: 14/092,792

(22) Filed: Nov. 27, 2013

(65) Prior Publication Data
US 2014/0086752 A1    Mar. 27, 2014

Related U.S. Application Data (63) Continuation of application No. PCT/GB2012/051249, filed on Jun. 1, 2012.

(30) Foreign Application Priority Data

Jun. 3, 2011    (GB) .................................. 1109412.5

(51) Int. Cl.
F03D 1/06    (2006.01)

(52) U.S. Cl.
CPC ............. *F03D 1/06* (2013.01); *F03D 1/0641* (2013.01); *F03D 1/0675* (2013.01);
(Continued)

(58) Field of Classification Search
CPC .......... F03D 1/06; F03D 1/065; F03D 1/0675; F03D 1/0683; F03D 1/0641;
(Continued)

(56) References Cited

U.S. PATENT DOCUMENTS

| 1,802,094 | A | * | 4/1931 | Stuart | .................. F03D 1/0608 |
| | | | | | 290/55 |
| 2,041,849 | A | * | 5/1936 | McCauley | .............. B64C 11/16 |
| | | | | | 29/889.6 |

(Continued)

FOREIGN PATENT DOCUMENTS

| CN | 1780982 A | 5/2006 |
| CN | 101220799 A | 7/2008 |

(Continued)

OTHER PUBLICATIONS

Jackson K J et al: Innovative design approaches for large wind turbine blades, Wind Energy, Wiley, Chichester, GB, vol. 8, No. 2, Apr. 1, 2005 (Apr. 1, 2005), pp. 141-171, XP002440739, ISSN: 1099=1824, DOI: 10.1002/WE.128, p. 142, p. 146-p. 150, figures 1, 5, table 1.

(Continued)

*Primary Examiner* — David E Sosnowski
*Assistant Examiner* — Wayne A. Lambert
(74) *Attorney, Agent, or Firm* — Dority & Manning, P.A.

(57) ABSTRACT

A wind turbine rotor comprising a hub (1) from which a plurality of blades (2) project to a radius of at least 50 meters. Each blade comprising a hollow fairing supported by a central spar. Each blade has a thickness t at a radius r; characterized in that when r=0.5 R, t>0.3 T, where R is the radius of the blade and T is the thickness of the blade at the root end. By being thicker for a greater proportion of the blade, the aerodynamic performance of this part of the blade is worse, but this is more than compensated for as it allows better aerodynamic performance where it matters more, namely at the outer part of the blade. It also allows larger blades to be provided.

17 Claims, 5 Drawing Sheets

(52) U.S. Cl.
CPC . *F05B 2240/301* (2013.01); *F05B 2280/2001* (2013.01); *F05B 2280/2006* (2013.01); *F05B 2280/5001* (2013.01); *F05B 2280/6003* (2013.01); *Y02E 10/721* (2013.01)

(58) Field of Classification Search
CPC ............ F03D 1/0633; F05B 2280/2006; F05B 2280/5001; F05B 2280/2001; F05B 2280/6003; F05B 2240/301; Y02E 10/721
See application file for complete search history.

(56) References Cited

U.S. PATENT DOCUMENTS

| | | | | |
|---|---|---|---|---|
| 3,233,678 | A * | 2/1966 | Wilk | B63H 23/34 416/241 A |
| 4,081,220 | A * | 3/1978 | Andrews | F03D 1/0675 416/226 |
| 4,260,332 | A * | 4/1981 | Weingart | B64C 11/20 416/218 |
| 4,295,790 | A * | 10/1981 | Eggert, Jr. | F03D 1/0675 416/226 |
| 4,668,169 | A * | 5/1987 | Perry | B64C 27/46 416/223 R |
| 4,773,825 | A * | 9/1988 | Rodde | B64C 11/18 416/223 R |
| 4,858,852 | A * | 8/1989 | Henne | B64C 3/14 244/198 |
| 4,976,587 | A | 12/1990 | Farone et al. | |
| 5,417,548 | A * | 5/1995 | Tangler | F03D 1/0641 416/223 R |
| 5,474,425 | A * | 12/1995 | Lawlor | F03D 1/065 416/223 R |
| 5,562,420 | A * | 10/1996 | Tangler | F03D 1/0641 416/223 R |
| 7,364,407 | B2 * | 4/2008 | Grabau | F03D 1/065 416/229 R |
| 7,438,533 | B2 * | 10/2008 | Eyb | F03D 1/0658 416/230 |
| 7,736,127 | B1 * | 6/2010 | Carr | F03B 3/06 290/54 |
| 7,802,968 | B2 * | 9/2010 | Jacobsen | F03D 1/065 416/226 |
| 7,942,637 | B2 * | 5/2011 | Akhtar | F03D 1/0675 29/889.72 |
| 8,079,819 | B2 * | 12/2011 | Zuteck | F03D 1/0675 416/226 |
| 8,419,373 | B1 * | 4/2013 | Fukami | F03D 1/0633 415/4.3 |
| 8,556,590 | B2 * | 10/2013 | Esaki | F03D 1/0675 416/226 |
| 8,568,103 | B2 * | 10/2013 | Enevoldsen | F03D 1/0641 416/223 R |
| 8,668,462 | B2 * | 3/2014 | Fischer | F03D 1/0641 416/242 |
| 8,801,387 | B2 * | 8/2014 | Fukami | F03D 1/0633 416/223 R |
| 8,814,525 | B2 * | 8/2014 | Petsche | F03D 1/0641 416/223 R |
| 2004/0105752 | A1 * | 6/2004 | Wobben | F03D 1/0641 415/4.1 |
| 2007/0036657 | A1 | 2/2007 | Wobben | |
| 2007/0189902 | A1 * | 8/2007 | Mohamed | B29C 70/24 416/226 |
| 2007/0189903 | A1 | 8/2007 | Eyb | |
| 2007/0297909 | A1 * | 12/2007 | Wobben | F03D 1/0641 416/223 R |
| 2008/0138206 | A1 * | 6/2008 | Corren | F03B 3/121 416/223 R |
| 2008/0317600 | A1 | 12/2008 | Enevoldsen et al. | |
| 2009/0274559 | A1 * | 11/2009 | Petsche | F03D 1/0641 416/223 R |
| 2010/0303632 | A1 * | 12/2010 | Nagy | F03D 1/0641 416/242 |
| 2010/0316500 | A1 * | 12/2010 | Blanton | F03D 1/0641 416/223 R |
| 2011/0123346 | A1 * | 5/2011 | Hancock | F03D 1/0675 416/241 A |
| 2011/0243751 | A1 * | 10/2011 | Fritz | F03D 80/70 416/241 R |
| 2011/0293432 | A1 * | 12/2011 | Hibbard | F03D 1/001 416/223 R |
| 2012/0020803 | A1 * | 1/2012 | Lees | F03D 7/0236 416/233 |
| 2012/0219424 | A1 * | 8/2012 | Lin | F03D 1/0675 416/226 |
| 2013/0022463 | A1 * | 1/2013 | Zuteck | F03D 7/022 416/1 |
| 2015/0064017 | A1 * | 3/2015 | Bohlen | F03D 1/0633 416/241 R |

FOREIGN PATENT DOCUMENTS

| | | | |
|---|---|---|---|
| DE | 203 20 714 U1 | 1/2005 | |
| WO | WO 03093672 A1 * | 11/2003 | ........... F03D 1/0675 |
| WO | 2009034291 A2 | 3/2009 | |
| WO | 2009130467 A2 | 10/2009 | |
| WO | 2010004012 A1 | 1/2010 | |
| WO | 2010041008 A1 | 4/2010 | |
| WO | 2011064553 A2 | 6/2011 | |
| WO | WO 2011/106733 | 9/2011 | |
| WO | 2011135306 A1 | 11/2011 | |
| WO | WO 2012/164305 | 12/2012 | |

OTHER PUBLICATIONS

TPI Composites, Sandia National Laboratories: "Innovative design approaches for large wind turbine blades". Albuquerque, New Mexico, Mar. 31, 2003 (Mar. 31, 2003), XP002682109, Retrieved from the Internet: URL:http://prod.sandia.gov/techlib/access-control.cgi/2003/030723.pdf [retrieved on Aug. 21, 2012], pp. 20-21, figure 3.3, table 3.1.

PCT International Search Report, Application No. PCT/GB2012/051249, dated Sep. 5, 2012.

UK Search Report, Application No. GB1109412.5. dated Sep. 20, 2011.

Unofficial English Translation of Chinese Office Action issued in connection with corresponding CN Application No. 201280027147.9 dated Dec. 2, 2015.

\* cited by examiner

WIND TURBINE ROTOR

CROSS-REFERENCE TO RELATED APPLICATIONS

This application is a continuation of Patent Cooperation Treaty International Patent Application PCT/GB2012/051249, filed Jun. 1, 2012, and entitled "A WIND TURBINE ROTOR," which is incorporated by reference herein in its entirety, and which claims priority to United Kingdom Patent Application 1109412.5, filed on Jun. 3, 2011.

BACKGROUND

Field

The present invention is directed to a wind turbine rotor. In particular, the present invention is directed to a modern large-scale wind turbine rotor. For the purposes of the specification, this will be defined as a wind turbine comprising a hub from which a plurality of blades project to a radius of at least 50 meters, each blade comprising a hollow fairing supported by a central spar.

Description of the Related Art

The current size of wind turbine blades is in the range of 35-55 m (radius measured from the centre of the hub to the tip of the blade). This is set to increase further in the coming years as plans are drawn up to build much larger machines for both onshore and offshore application which would require blades of size in the range of 50-100 m.

The current blade technology it scaled up 'as is' or with minor modifications will lead to a number of manufacturing challenges and additionally will lead to a number of design challenges for the complete turbine designer. The principal challenge is that of dealing with the very large mass of the blades which leads to very massive and therefore expensive parts for the turbine and its foundations in order to deal with the loads and in particular the fatigue loads that are placed on the turbine and its foundations.

Figure 5:
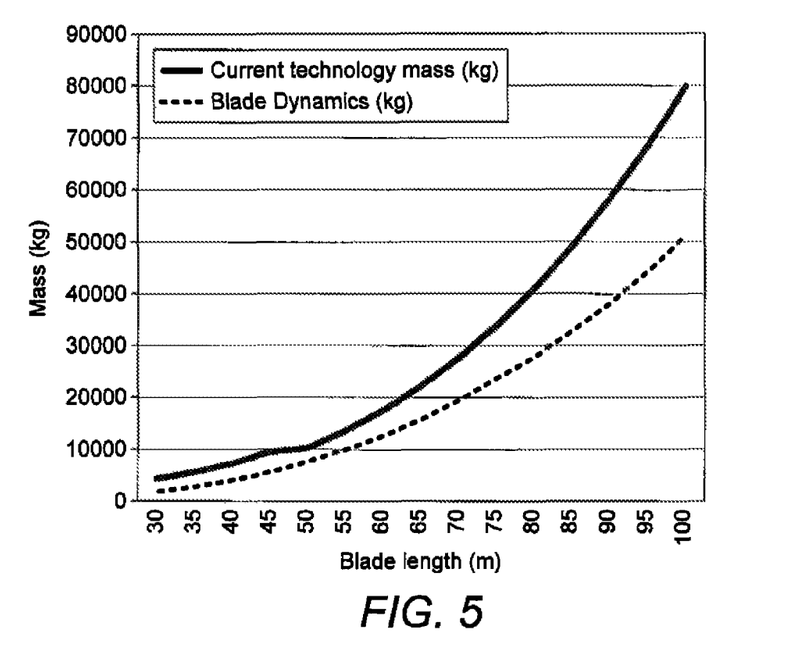
FIG. 5 is a graph of mass against blade length providing a comparison between the present invention and the prior art.

Current blade design methodology would lead to the blade mass increasing roughly as the blade length to the power of 2.95. This is shown to be true in the case of some of the current early attempts to build large blades and is shown in FIG. 5.

In addition, as blades get larger the natural frequency of the blade drops and it becomes closer to excitation frequencies seen during operation of the turbine.

SUMMARY

According to a first aspect of the present invention, there is provided a wind turbine rotor comprising a hub from which a plurality of blades project to a radius of at least 50 meters, each blade comprising a hollow fairing supported by a central spar, each blade having a thickness t at a radius r; characterised in that when $r=0.5 R$, $t>0.3 T$, where R is the radius of the blade and T is the thickness of the blade at the root end.

In a conventional blade design, the thickness tapers off much more rapidly, so that at the halfway point of the blade (measured from the centre of the hub to the tip of the blade), the thickness t of the blade is typically around 20% of the root end thickness T. In the present invention, it retains more than 30% of its root end thickness at this point.

The approach taken by the present invention is a radical shift away from typical aerodynamic and structural ratios. Instead, the present invention contemplates a blade which is actually significantly worse in terms of its aerodynamic performance for the inner part of the blade. Instead, the considerations for the design of the inner part of the blade are almost totally dominated by the structure. On the other hand, for the outer part of the length, the design considerations are almost totally dominated by aerodynamics. The "aerodynamic loss" caused by the poor aerodynamics of the inner part is more than compensated for by making less aerodynamic compromises on the outer part of the blade. It also allows much longer blades to be produced as the inner part of the blade can be made much lighter with the aerodynamic restriction lifted. This allows greater aerodynamic performance without dramatically increasing the fatigue loads.

Preferably, when $r=0.5 R$, $t>0.4 T$, and more preferably $>0.5 T$. In other words, at halfway along the blade, the blade preferably still retains at least 40%, and more preferably 50% of its thickness at the root end.

According to a second aspect of the invention, there is provided a wind turbine rotor comprising a hub from which a plurality of blades project to a radius of at least 50 meters, each blade comprising a hollow fairing supported by a central spar, each blade having a thickness t at a radius r; characterised in that when $r=0.25 R$, $t>0.6 T$, where R is the radius of the blade and T is the thickness of the blade at the root end.

Preferably, when $r=0.25 R$, $t>0.7 T$, and more preferably, $>0.8 T$. In other words, a quarter of the way along the blade (from the centre of the hub), the blade retains at least 60%, preferably at least 70%, and more preferably at least 80% of its thickness at the root end. A conventional blade retains about 50% of its thickness at this point.

According to a third aspect of the invention, there is provided a wind turbine rotor comprising a hub from which a plurality of blades project to a radius of at least 50 meters, each blade comprising a hollow fairing supported by a central spar, each blade having a thickness t at a radius r; characterised in that when $r=0.4 R$, $t>0.5 T$, where R is the radius of the blade and T is the thickness of the blade at the root end.

Preferably, when $r=0.4 R$, $t>0.6 T$ and more preferably $>0.7 T$. In other words, 40% of the way along the blade (from the centre of the hub), the blade retains at least 50%, preferably at least 60%, and more preferably at least 70% of its thickness of the root end. A conventional blade retains about 30% of its thickness at this point.

A further benefit of a blade which is thicker along a greater portion of its innermost length relates to the use of materials. As the inner portion of the blade is thicker, the stiffness can be maintained for a larger blade without having to resort to higher modulus fiber composites for this inner portion. Preferably, therefore, the spar at least partially comprises a glass fiber reinforced epoxy resin laminate along an inner portion of its length and a carbon fiber reinforced epoxy resin laminate along an outer portion of its length. Thus, the use of higher performance materials at the outermost region of the blade further enhances the ability of the blade to maintain its stiffness while having very low drag because it can be made relatively thinner by further increasing performance. This also further increases the natural frequency of the blade thereby helping to avoid the excitation frequencies.

The use of the materials in the inner and outer parts of the spar can also be defined in terms of the Young's Modulus. Lower performance composite materials can be used in the inner part of the blade as the increased thickness of the blade stiffness to be maintained for a large blade without resorting to higher modulus composites.

Preferably, the spar at least partially comprises an inner portion having spar caps with fibers extending longitudinally in a principle bending direction, wherein at least part of the spar caps in the inner portion comprise a Young's Modulus in the principle direction <50 GPa and a ratio of Young's Modulus/density of <0.027 GPa/kgm$^3$, and an outer portion having spar caps with fibers extending longitudinally in the principle bending direction, wherein at least part of the spar caps in the outer portion comprise a Young's Modulus in the principle bending direction of >100 GPa and a ratio of Young's Modulus/density of >0.059 GPa/kgm$^{-3}$.

The present invention also extends to a blade for a rotor according to any one of the aspects of the invention defined above.

BRIEF DESCRIPTION OF THE DRAWINGS

An example of a rotor and blade in accordance with the present invention will now be described with reference to the accompanying drawings, in which.

DETAILED DESCRIPTION

The techniques used to construct the blade and assemble it to the rotor hub could be conventional blade manufacturing techniques, but preferably are as disclosed in our earlier applications WO 2009/034291, WO 2009/034292, WO 2009/130467, WO 2010/041008, WO 2010/04012, PCT/GB2010/002189 and PCT/GB2011/000661.

These documents disclose techniques for making wind turbine blades which can be made to any desired geometry.

As the present invention relates only to a change in external geometry, and consequential change of materials, only the geometry and materials will be described below.

Figures 1, 1A:
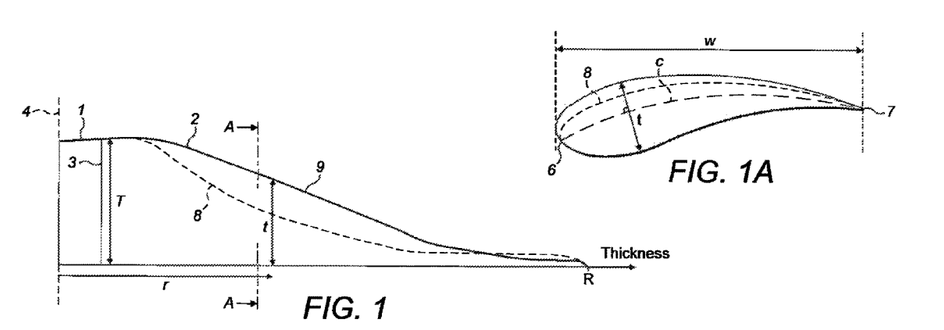
FIG. 1 is a foreshortened and schematic cross-section in a plane parallel to the axis of rotation through a rotor according to the present invention from the axis of rotation to the tip of the blade with a cross-section of a conventional blade shown in dashed lines for comparison.
FIG. 1A is a cross-section of a blade through line A-A in FIG. 1 with a conventional blade in dashed lines for comparison.
Figure 2:
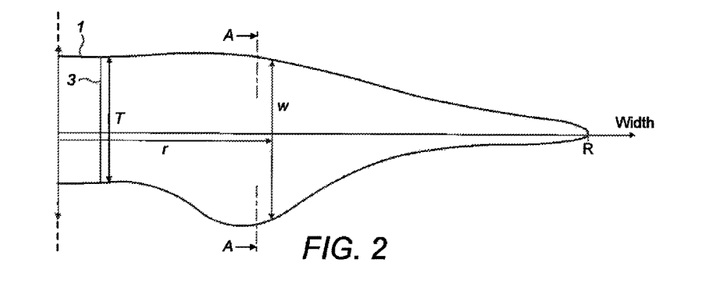
FIG. 2 is a view similar to FIG. 1, but showing a plan view of the blade.

The rotor comprises a central hub 1 to which a plurality of blades 2 are attached (only one blade 2 is shown in FIGS. 1 and 2) at interface 3 as set out in the above applications. The hub rotates about an axis 4. Three such blades 2 are attached to each hub 1. The radius R of the blade is the distance from the axis of rotation 4 to the distal tip 5 of the blade. Typically, the first 1 to 3 meters of the radius R are occupied by the hub 1, and the remainder of the radius is provided by the blade itself. The blade has a central spar extending along its full length to provide structural rigidity and an aerodynamic fairing to provide the external surface of the blade, as is well known in the art.

The root end thickness T represents the external dimension of the blade in a direction parallel to the axis of rotation where it meets the hub. At this point, the blade may have a projecting portion which is inserted inside the hub to allow it to be attached to the hub. This is not considered when determining the thickness T for the purposes of this invention as T is a measure of external thickness. Further, the root end of the lid may be provided with an outwardly protruding flange as part of the structure to fasten it to the hub 1. Any such flange should be disregarded for the purposes of determining the thickness T for the purposes of the present invention.

As shown in FIG. 1A, the blade has an aerofoil shape with leading edge 6 and trailing edge 7 defining the width "W" as indicated in FIGS. 1A and 2) of the blade. The thickness t is determined in a plane which is perpendicular to the radius of the blade, such as the plane shown in FIG. 1A. In this plane, the thickness t is the dimension which is perpendicular to the camber line C as shown in FIG. 1. The camber line is a line drawn from the leading edge 6 to the trailing edge 7 and which is equidistant between the upper and lower surfaces of the blade at all points.

At the interface 3, the blade has a generally circular cross-section and becomes increasingly flat in cross-section along the length of the blade as the thickness t reduces.

The extent of this reduction in thickness of a conventional blade is shown in the dashed line 8 in FIG. 1, while the thickness profile of the present invention is shown by line 9.

Figure 3A:
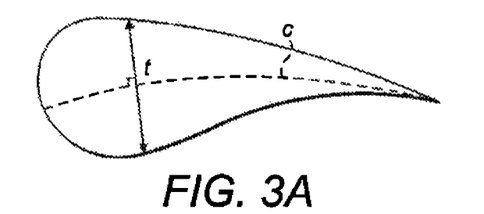
FIGS. 3A-3D are views similar to FIG. 1A showing a different blade configuration.
Figure 3B:
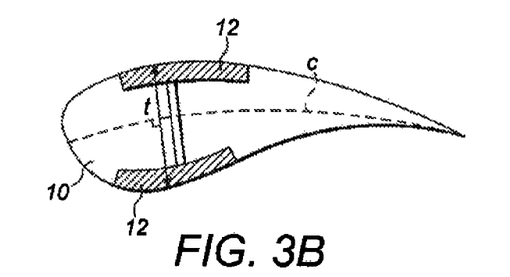
Figure 3C:
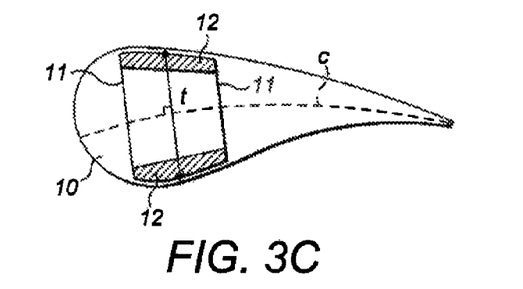

FIGS. 3A-3B are views similar to FIG. 1A having different configurations of spar cap. FIG. 3A is essentially the same as FIG. 1A for comparison. FIG. 3B shows a spar 10 having an I-beam cross-section with a shear web 11 bounded on either side by a pair of spar caps 12. In FIG. 3C, the spar 10 is a box beam and has a pair of shear webs 11 bounded by a pair of spar caps 12. The spar may have all manner of configurations as set out in the prior art documents referred to above.

Figure 3D:
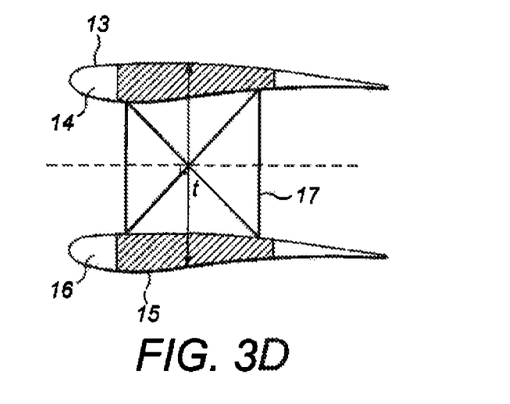

FIG. 3D shows a blade having a double-wing structure. In this case, the camber line is drawn as a line midway between the top surface 13 of the upper wing 14 and the lower surface 15 of the lower wing 16. The thickness t is determined accordingly. The upper 14 and lower 16 wings are connected by shear braces 17.

Figure 4:
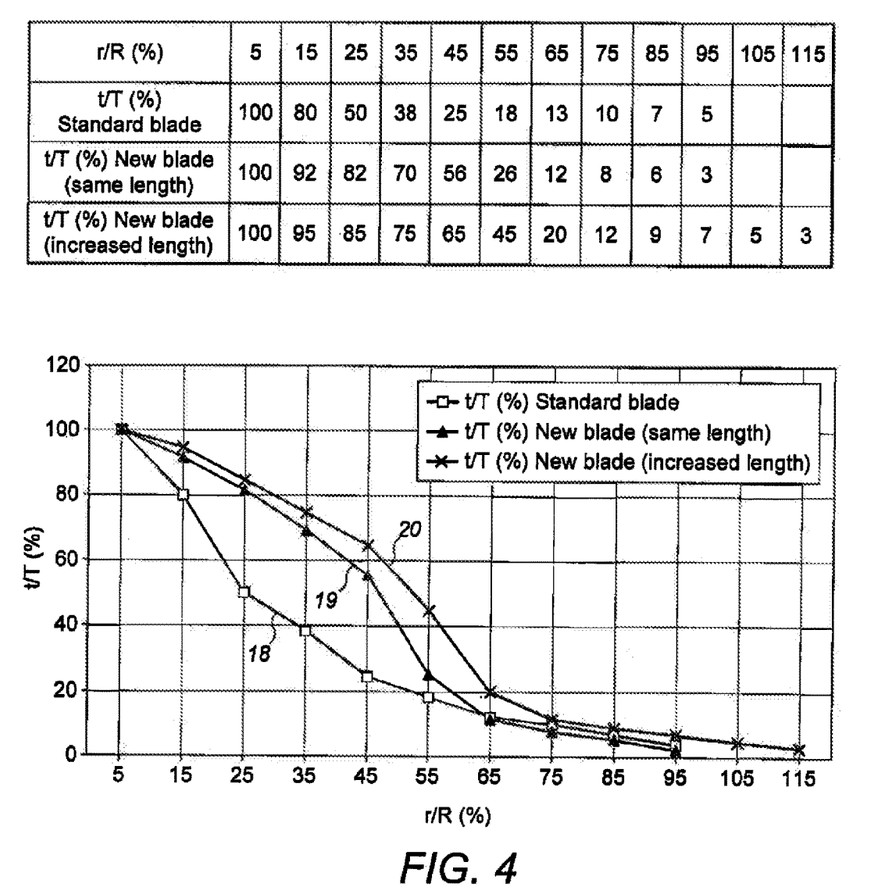
FIG. 4 is a graph showing thickness ratio against radius ratio for a conventional blade, a blade of comparable length according to the present invention and a longer blade according to the present invention.

Further details of this reduction in thickness are given in FIG. 4. This shows the ratio of the thickness t to the thickness T at the root end on the Y axis against the ratio of the radius r at the point at which t is measured to the radius R of the rotor. The value of t used is the maximum 't' that can be measured using the above method for each cross-section. In other words, this represents the thickness at the fattest part of the blade. Line 18 shows a conventional blade while line 19 shows a blade of the same length manufactured according to the present invention. The present invention allows longer blades to be manufactured. In this case, line 20 shows a thickness profile for a blade which is 15% longer than the blades depicted by the lines 18 and 19. The data for the graph is given in the table above the graph.

As can be seen from FIG. 4, a conventional blade rapidly becomes much thinner, to the extent that it is half of the root end thickness T only 25% of the way along the blade, the blade according to the present invention retains a far greater proportion of its thickness for longer. Thus, quarter of the way along the blade, it still retains 80% of its root end thickness. At the 45% line, a conventional blade has less than 30% of its original thickness, while the present invention has greater than 50%.

This has two effects on the performance of the blade.

Figure 6:
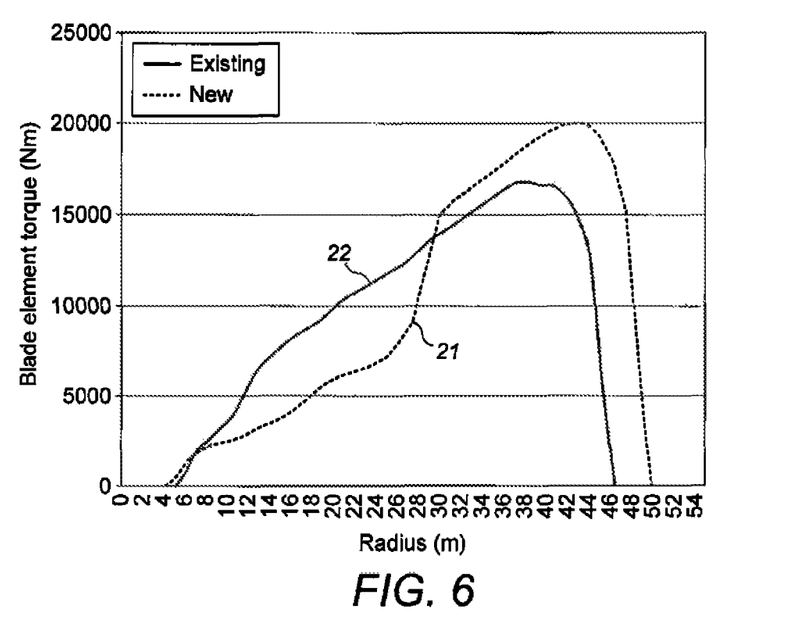
FIG. 6 is a graph of torque against radius showing the performance of the present invention against the prior art.

Firstly, as will be apparent from a consideration of FIG. 1A, the flatter cross-section results in less aerodynamic cross-section such that the efficiency of the blade of the present invention at this point is reduced. This is illustrated in FIG. 6 which shows the power output provided along the length of the blade. The power output provided by the present invention is indicated by a line 21 while the power output provided by a conventional blade is illustrated by line 22. It can be seen that the power output contributed by the first 30 meters of the blade is significantly lower in the present invention than for the prior art.

In addition, the inner part of the blade can be made much lighter as will now be explained with reference to FIGS. 7A and 7B.

Figure 7A:
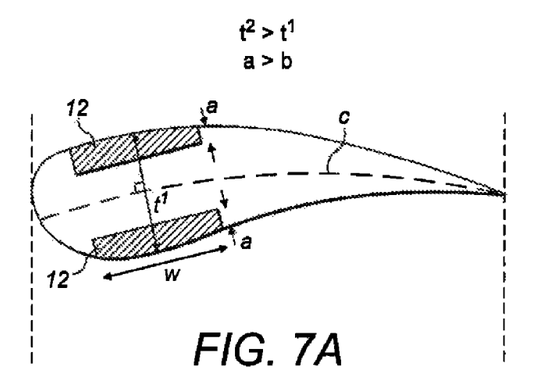
FIGS. 7A and 7B are cross-sections similar to FIG. 1A showing the prior art and the present invention respectively illustrating the advantage provided by the present invention.
Figure 7B:
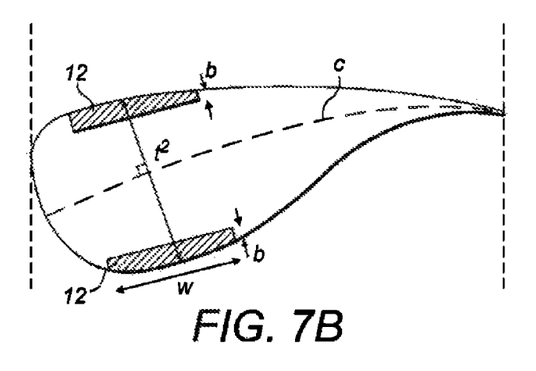

FIG. 7A is a cross-section of the prior art, while FIG. 7B is a cross-section of the present invention for comparison. As the present invention is not optimised for aerodynamics, it is significantly thicker as shown in FIG. 7B. In both cases, the width of the blade and the width ("w" as indicated in FIGS. 7A and 7B) of the spar caps is equal. However, because in the present invention, the spar caps are further from the camber line C (and in structural terms further away from the neutral axis), they are much more able to resist the bending moments about the camber line C. As a result of this, the spar caps 12 of the present invention can be made with a thickness b which is significantly thinner than the corresponding thickness a required for the spar caps of the prior art.

Further, the improved structural integrity provided by the less aerodynamic inner portion means that the inner portion can effectively support a much longer outer portion so that, as well as improving blade efficiency, it also increases the maximum length of the blade which can be produced.

FIG. 5 shows the relationship between the mass and blade length. From this, it is clear that this invention has broken the relationship of the prior art blades that the blade mass increases roughly as the blade length to the power of 2.95. As shown in FIG. 5, the relationship is closer to the blade mass increasing roughly as the blade length to the power of 2.75.

What is claimed is:

1. A wind turbine rotor comprising:
a hub; and
a plurality of blades extending from the hub, each blade having a radius (R) of at least 50 meters, each blade comprising a hollow fairing supported by a central spar, the hollow fairing including a pressure side and a suction side extending lengthwise between a leading edge and a trailing edge, the hollow fairing defining a camber line extending between the leading and trailing edges that is equidistant from the pressure and suction sides at each point along the camber line, each blade having a thickness (t) at a given radial station (r) along the blade, the thickness (t) being defined in a plane extending perpendicular to the camber line,
wherein, when r=0.5 R, t>0.4 T, when r=0.4 R, t>0.5 T, and when r=0.25 R, t>0.6, and
where T is a thickness of the blade at a root end of the blade and where the thickness (t) differs between the root end of the blade and radial station r=0.25 R and between radial station r=0.25 R and radial station r=0.5 R by at least 15%.

2. A rotor according to claim 1, wherein, when r=0.5 R, t>0.5 T.

3. A rotor according to claim 2, wherein, when r=0.25 R, t>0.8 T.

4. A rotor according to claim 3, wherein, when r=0.4 R, t>0.7 T.

5. A rotor according to claim 2, wherein, when r=0.4 R, t 0.7 T.

6. A rotor according to claim 1, wherein, when r=0.25 R, t>0.7 T.

7. A rotor according to claim 6, wherein, when r=0.4 R, t>0.6 T.

8. A rotor according to claim 1, wherein, when r=0.4 R, t>0.6 T.

9. A rotor according to claim 1, wherein the spar at least partially comprises a glass fibre reinforced epoxy resin laminate along an inner portion of its length and a carbon fibre reinforced epoxy resin laminate along an outer portion of its length.

10. A rotor according to claim 1, wherein the spar comprises an inner portion having spar caps with fibers extending longitudinally in a principle bending direction, wherein at least part of the spar caps in the inner portion comprise a Young's Modulus in the principle bending direction <50 GPa and a ratio of Young's Modulus/density of <0.027 GPa/kgm$^{-3}$, and an outer portion having spar caps with fibers extending longitudinally in the principle bending direction, wherein at least part of the spar caps in the outer portion comprise a Young's Modulus in the principle bending direction of >100 GPa and a ratio of Young's Modulus/density of >0.059 GPa/kgm$^{-3}$.

11. A rotor according to claim 1, wherein the spar comprises at least one shear web running across the thickness of the blade and at least one spar cap at each end of the shear web.

12. A wind turbine rotor comprising:
a hub; and
a plurality of blades extending from the hub, each blade having a radius (R) of at least 50 meters, each blade comprising a hollow fairing supported by a central spar, the hollow fairing including a pressure side and a suction side extending lengthwise between a leading edge and a trailing edge, the hollow fairing defining a camber line extending between the leading and trailing edges that is equidistant from the pressure and suction sides at each point along the camber line, each blade having a thickness (t) at a given radial station (r) along the blade, the thickness (t) being defined in a plane extending perpendicular to the camber line,
wherein, when r=0.5 R, t>0.5 T, when r=0.4 R, t>0.6 T, and when r=0.25 R, t>0.7 T, and
where T is a thickness of the blade at a root end of the blade and where the thickness (t) differs between the root end of the blade and radial station r=0.25 R and between radial station r=0.25 R and radial station r=0.5 R by at least 15%.

13. A rotor according to claim 12, wherein, when r=0.4 R, t>0.7 T.

14. A rotor according to claim 12, wherein, when r=0.25 R, t>0.8 T.

15. A rotor according to claim 12, wherein the spar at least partially comprises a glass fibre reinforced epoxy resin laminate along an inner portion of its length and a carbon fibre reinforced epoxy resin laminate along an outer portion of its length.

16. A rotor according to claim 12, wherein the spar comprises an inner portion having spar caps with fibers extending longitudinally in a principle bending direction, wherein at least part of the spar caps in the inner portion comprise a Young's Modulus in the principle bending direction <50 GPa and a ratio of Young's Modulus/density of 0.027 GPa/kgm$^{-3}$ and an outer portion having spar caps with fibers extending longitudinally in the principle bending direction, wherein at least part of the spar caps in the outer portion comprise a Young's Modulus in the principle bending direction of >100 GPa and a ratio of Young's Modulus/density of >0.059 GPa/kgm$^{-3}$.

17. A rotor according to claim 12, wherein the spar comprises at least one shear web running across the thickness of the blade and at least one spar cap at each end of the shear web.

* * * * *